(12) United States Patent
Höf et al.

(10) Patent No.: US 7,739,542 B2
(45) Date of Patent: Jun. 15, 2010

(54) PROCESS FOR DETECTING THE AVAILABILITY OF REDUNDANT COMMUNICATION SYSTEM COMPONENTS

(75) Inventors: Jonas Höf, München (DE); Norbert Löbig, Darmstadt (DE); Jürgen Tegeler, Penzberg (DE); Michael Tinnacher, Köflach (AT); Dieter Wallner, Graz (AT)

(73) Assignee: Nokia Siemens Network GmbH & Co. KG, Munich (DE)

(*) Notice: Subject to any disclaimer, the term of this patent is extended or adjusted under 35 U.S.C. 154(b) by 151 days.

(21) Appl. No.: 11/791,689

(22) PCT Filed: Oct. 11, 2005

(86) PCT No.: PCT/EP2005/055173

§ 371 (c)(1),
(2), (4) Date: Mar. 18, 2008

(87) PCT Pub. No.: WO2006/056506

PCT Pub. Date: Jun. 1, 2006

(65) Prior Publication Data

US 2008/0178037 A1 Jul. 24, 2008

(30) Foreign Application Priority Data

Nov. 26, 2004 (DE) .................. 10 2004 057 209

(51) Int. Cl.
*G06F 11/00* (2006.01)
(52) U.S. Cl. .............................. 714/4; 714/11; 714/13
(58) Field of Classification Search ............... 714/4, 714/11, 13

See application file for complete search history.

(56) References Cited

U.S. PATENT DOCUMENTS

| 5,974,114 A | 10/1999 | Blum et al. |
| 6,343,007 B1* | 1/2002 | Dubois et al. ............ 312/223.2 |
| 6,378,021 B1* | 4/2002 | Okazawa et al. ............ 710/317 |
| 7,058,853 B1* | 6/2006 | Kavanappillil et al. ........ 714/13 |
| 2002/0073409 A1 | 6/2002 | Lundback et al. |
| 2008/0178037 A1* | 7/2008 | Hof et al. ...................... 714/4 |

FOREIGN PATENT DOCUMENTS

| DE | 100 40 467 A1 | 2/2002 |
| EP | 1 133 197 A | 9/2001 |

* cited by examiner

*Primary Examiner*—Robert Beausoliel
*Assistant Examiner*—Charles Ehne
(74) *Attorney, Agent, or Firm*—Laurence A. Greenberg; Werner H. Stemer; Ralph E. Locher

(57) ABSTRACT

A process is disclosed for detecting the availability of components of a redundant communication system in which hardware components are available at least in duplicate, the redundant system components taking over the function of the previously active operating system components when one or more hardware components break down. The system components operate together in resource groups and each resource group can run on at least two hardware components. In order to permit system component availability to be detected, one resource group operates actively on precisely one single hardware component and the at least one redundant resource group runs on at least one additional system component in a standby mode, the data in the active resource group being automatically replicated.

9 Claims, 3 Drawing Sheets

PROCESS FOR DETECTING THE AVAILABILITY OF REDUNDANT COMMUNICATION SYSTEM COMPONENTS

CROSS REFERENCE TO RELATED APPLICATIONS

This application is the US National Stage of International Application No. PCT/EP2005/055173, filed Oct. 11, 2005 and claims the benefit thereof. The International Application claims the benefits of German application No. 102004057209.7 DE filed Nov. 26, 2004, both of the applications are incorporated by reference herein in their entirety.

FIELD OF INVENTION

The invention relates to a process for detecting the availability of system components of a communication system of redundant design in which hardware devices that operate the system components of the communication system are available at least in duplicate, with some system components being active in normal mode of the communication system and the redundant system components available for these being operated in standby mode and the redundant available system components taking over the function of the previously active operating system components if one or more hardware devices fails.

BACKGROUND OF INVENTION

A redundant design of communication systems is used in order to ensure the continuation of the required system function by means of the corresponding redundant components in the event of failure of individual components. This increases the availability and reliability of the complete system. The proper takeover of the function by the redundant components naturally depends essentially on their correct functioning.

SUMMARY OF INVENTION

Because, however, the redundant components are not used in normal mode, faults can occur on or in said components that remain undetected until failure of the components in use. This mode is normally called active/standby redundancy. In this case, the active components provide the relevant function. The components in standby mode are available in order to take over the function of the currently active components in the event of failure.

If one or more faults of the standby components, however, is/are not detected until they are to take over the functioning due to failure of the active components, this leads to total failure of the system.

The availability of the standby components must therefore be equally continuously ensured. Failure of standby components must be detected and rectified by suitable repair measures, in order to guarantee the availability of the complete system.

Previously, a periodic self-test of these standby components was, for example, carried out to check the availability of the standby components. The reliability of the self-test naturally depends on the tests used for the purpose and on the test severity. The closer the test conditions to the function required in active mode the more it is ensured that, notwithstanding constant testing, the takeover of the function by the standby components after a failure of the active components will not fail. A main disadvantage is the cost/effort involved in a reliable availability verification, especially as this is incurred exclusively for the availability verification.

For switching systems operated in active/standby redundancy, a "routine switchover" is a mandatory requirement in the United States of America. In this case, the standby components periodically take over the function of the active components. If it is successful, the availability of the components previously operated in standby mode is thus verified. In the event of failure, a switchback to the components already previously operated as active components takes place. This is followed by a detailed analysis of the cause of the failure.

The cost/effort involved in the routine switchover alone is generally less than for a reliable self-test of the standby components. An inherent disadvantage with routine switchover is, however, the switchover per se because it impairs the functioning of the system, at least briefly. The function of the system is either unavailable or offers only limited availability for the duration of the switchover. For example, connection attempts can to a considerable extent be rejected in switching systems during the switchover or certain features, such as conference switching, may no longer be available for existing connections after the switchover. Such limitations can only be reduced or even avoided, if at all, at quite considerable expense.

A further disadvantage of a purely active/standby mode is the procurement and maintenance costs for the standby components that are kept merely for the takeover of the function in the event of failure of the active components. Where there is a strict redundant pair formation with a standby component assigned to each active component, this doubles the hardware costs compared with operation without redundancy.

An object of the invention is therefore to provide a method for the verification of the availability of system components of a communication system of redundant design, that enables a more exact and reliable proof of the availability of system components without additional expense/effort and that completely avoids the disadvantage of the previously used routine switchover.

This object is achieved by the features of the independent claims. Advantageous developments of the invention are the subject matter of the dependent claims.

The inventor has realized that a sound and reliable proof of availability of system components of a communication system of redundant design can be achieved without additional hardware and/or software expense if the system components of the communication system are combined into resource groups and these are selectively distributed to hardware devices. For example, in switching systems, the tasks of the individual software and hardware units are similar or even identical so that combining them into task-specific resource groups is enabled.

Accordingly, the inventor proposes to improve the known method of verifying the availability of system components of a communication system of redundant design in which hardware devices that operate the system components of the communication system are available at least in duplicate, with some system components being active during normal mode of the communication system and with the available redundant system components for these being operated in standby mode and the available redundant system components taking over the function of the previously actively operated system components when one or more of the hardware devices fails, in such a way that the system components and the communication channels, software processes and data at least used by these are combined, functionally and/or relative to tasks, to operate together in resource groups and each resource group can run on at least two hardware devices and in normal mode, and in order to verify the availability of system components one resource group operates actively on precisely one single hardware device and the at least one redundant resource group operates on at least one additional hardware device in standby mode, with the data in the active resource group being automatically replicated in the data in the assigned redundant resource group.

In this way at least one resource group is actively operated on each hardware device. This means that none of the hardware devices is operated exclusively in standby mode. All hardware devices are therefore available and actively operated. In particular, the disadvantages of the previously used routine switchover are completely avoided, for example the unavoidable impairment of the system functioning in normal mode during the routine switchover.

The selective distribution of the resource groups also allows a better utilization of the hardware devices than in the purely active/standby mode. This is clearly advantageous for more than two hardware devices and more than two resource groups that can run on each other, because the probability that one hardware device has to operate all resource groups in the active role reduces. However, even where there are only two hardware devices as a redundant pair and two resource groups each, advantages result due to the distribution, for example on computers with Unix-like operating systems.

Unix operating systems therefore operate with considerably greater stability up to a certain CPU utilization compared with a higher utilization. In the purely active/standby mode, the switching must therefore be chosen so that the CPU utilization enables a stable long-term operation, because the particular active hardware device must always be able to cope with the full load. Where there are two resource groups distributed to both hardware devices in normal mode on the other hand, the total load falls on the remaining one only in the event of failure of one hardware device and also only for the duration of the failure or repair.

The risk of instability due to the higher load thus increases also only in this comparatively short time period, i.e. load peaks would have to occur in this time period in order to endanger stability.

The selective distribution of the resource groups thus provides the possibility of being able to manage more traffic on each of the hardware devices in fault-free operation, or at least with the same switching arrangement as the purely active/standby mode to have more reserves available to deal with load peaks.

As an option, the method can show which system components and/or resource groups are presently active or operating in standby mode. The display option is, for example, then advantageous if certain hardware devices are to be taken out of service for repairs or for updating the software.

As an alternative or in addition to the display of the elements in the active or standby mode, the active system components and/or active resource groups can be switched as required to the standby mode or vice-versa. In this way, certain hardware devices can be taken out of service for repairs or for updating the software.

This switching from active to standby mode or vice versa can, for example, be implemented through software processes or the system components used by the software process.

For example, a failover control component can implement the switchover. For redundancy reasons, these failover control components should be distributed over the hardware devices, in the same way as the resource groups. Because of the distribution it is again necessary for the failover control components to detect the status information relevant for the operation of the resource groups. If the failover control components are running on the hardware devices where the resource groups are also operated, they can themselves determine the relevant status information, such as CPU capacity, hardware availability, availability of communication channels, replication status etc. and pass this on to the partner failover control components on the other hardware devices. The correct sequence of the failover control components and the data exchange between them on their own require at least some CPU capacity and communication bandwidth, which can be ensured by suitable measures such as prioritizing, reserving of budgets/bandwidth, dedicated/high-availability communication channels or similar. This can, for example, also be achieved if the failover control components run on dedicated hardware devices that have no, or only substantially minor, other tasks to perform.

It is also advantageous for the method if only the particular failover control component that is operated in the active role implements the switchover and in each case switches over the resource group of a different hardware device. In this way, the failover control components as a decision entity are decoupled from the logic of the role switchover of the resource groups as an implementation entity. This decoupling is an essential precondition for the trouble-free scaling of the failover control components during a corresponding distribution. The logic of the role switchover of the resource group is always limited to one hardware device. It must, for example, ensure the correct sequence of the switchover of the individual resources including monitoring and fault management. The failover control components in turn can therefore operate on a distinctly higher logic level and thus remain comparatively easy to implement and test, even for more complex distribution scenarios.

The hardware devices can at least be operated as a redundant pair, preferably as a redundant triple, with at least two resource groups being operated on one hardware device.

BRIEF DESCRIPTION OF THE DRAWINGS

The invention is explained in more detail in the following using preferred exemplary embodiments with the aid of figures, with only those elements essential for the immediate understanding of the invention being shown. The following reference characters are used:

1: first hardware device; 1.1: first resource group of the first hardware device; 1.1.1: data A; 1.1.2: data B; 1.1.3: data C: 1.1.4: first software process of the first resource group of the first hardware device; 1.1.5: second software process of the first resource group for the first hardware device; 1.2: second resource group of the first hardware device; 1.2.1: replicated data X; 1.2.2: software process of the second resource group of the first hardware device; 1.3: third resource group of the first hardware device; 1.4: failure of the first hardware device; 1.5: failover control component (FO-CTRL) of the first hardware; 2: second hardware device; 2.1.: first resource group of the second hardware device; 2.1.1: replicated data A; 2.1.2: replicated data B; 2.1.3: replicated data C; 2.1.4: first software process of the first resource group of the second hardware device; 2.1.5: second software process of the first resource group of the second hardware device; 2.2: second resource group of the second hardware device; 2.2.1: data X; 2.2.2: software process of the second resource group of the second hardware device; 2.3: third resource group of the second hardware device; 2.5: failover control component of the second hardware; 3: third hardware device; 3.1: first resource group of the third hardware device; 3.2: second resource group of the third hardware device; 3.3: third resource group of the third hardware device; 3.4: fourth resource group of the third hardware device; 3.5: failover control component of the third hardware; 4: fourth hardware device; 4.1: first resource group of the fourth hardware device; 4.2: second resource group of the fourth hardware device; 4.3: third resource group of the fourth hardware device; 4.4: fourth resource group of the fourth hardware device; 4.5: failover control component of the fourth hardware; 5: communication channels; 6: data replication; 7: active FO-CTRL of HW1 controls hardware 3 and 4; 8: active FO-CTRL of HW3 controls the hardware 1 and 2; 9: cyclic exchange of status data; 10: redundant pair; 11: redundant triple; A: components are active; S: components are in standby mode; S1: first standby mode; S2: second standby mode.

The drawings are as follows

Figure 1:
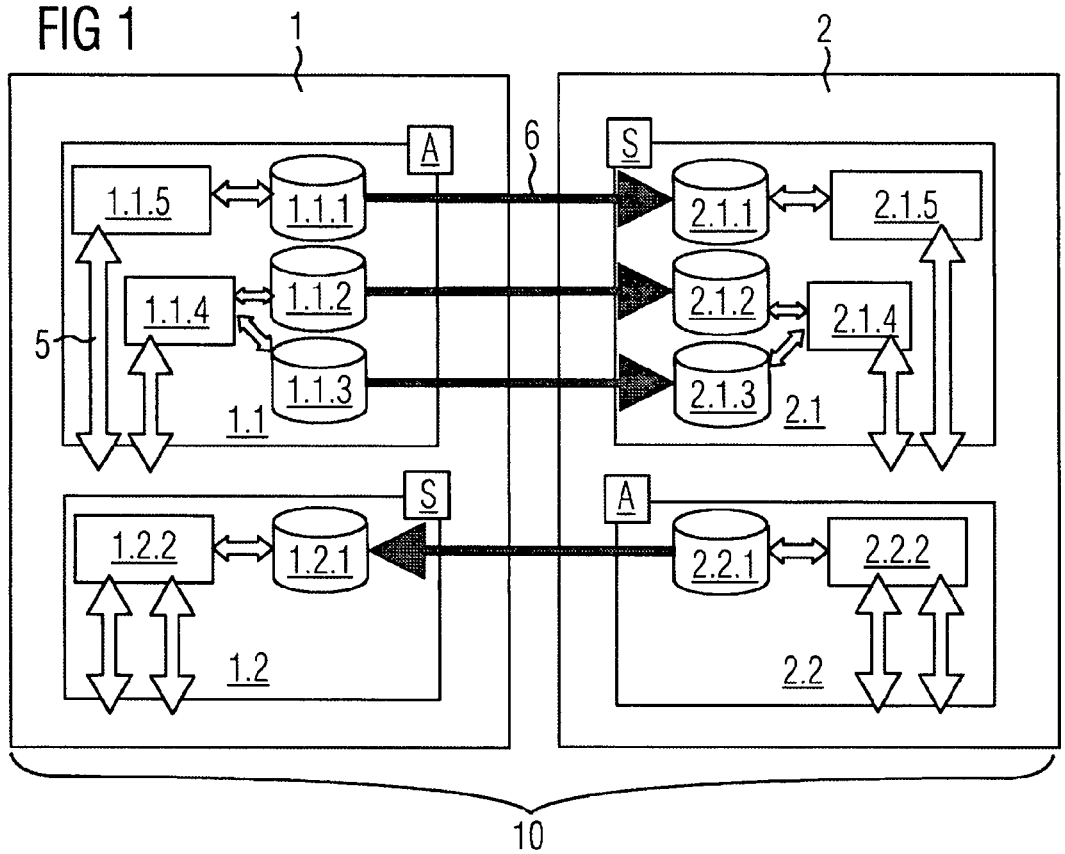
Figure 2:
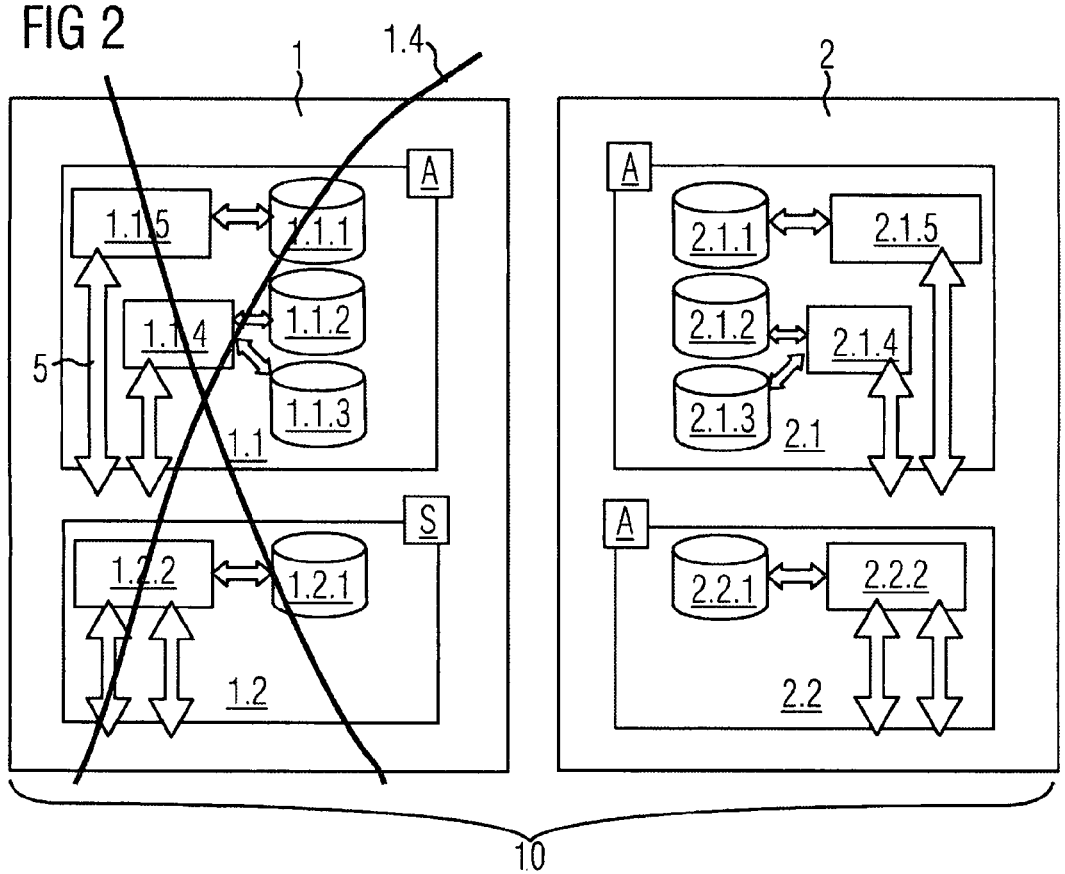
Figure 3:
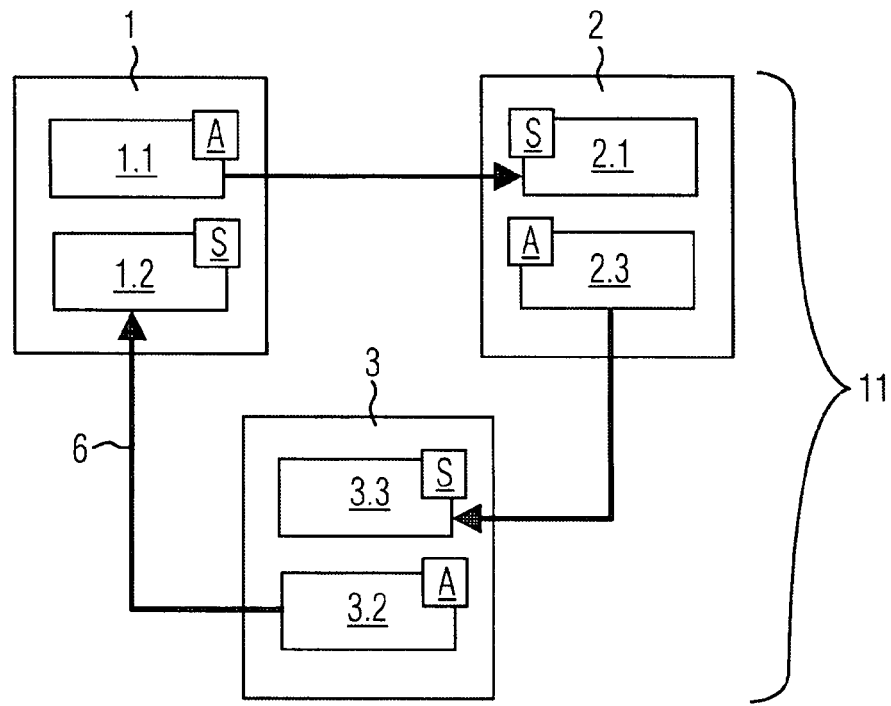
Figure 4:
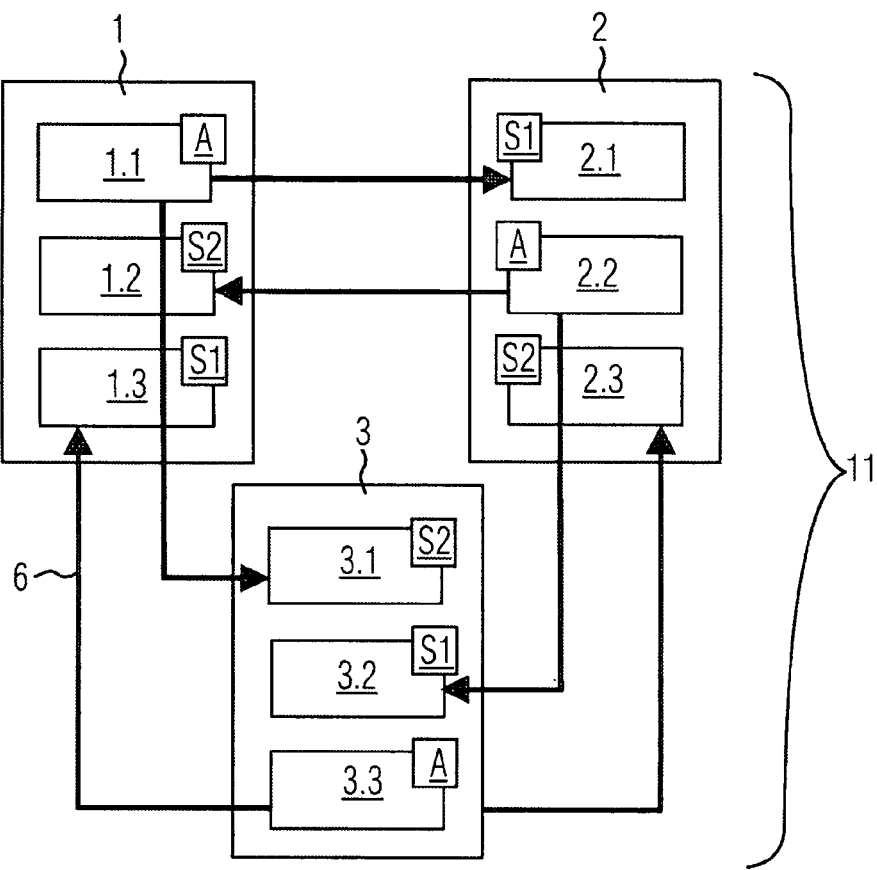
Figure 5:
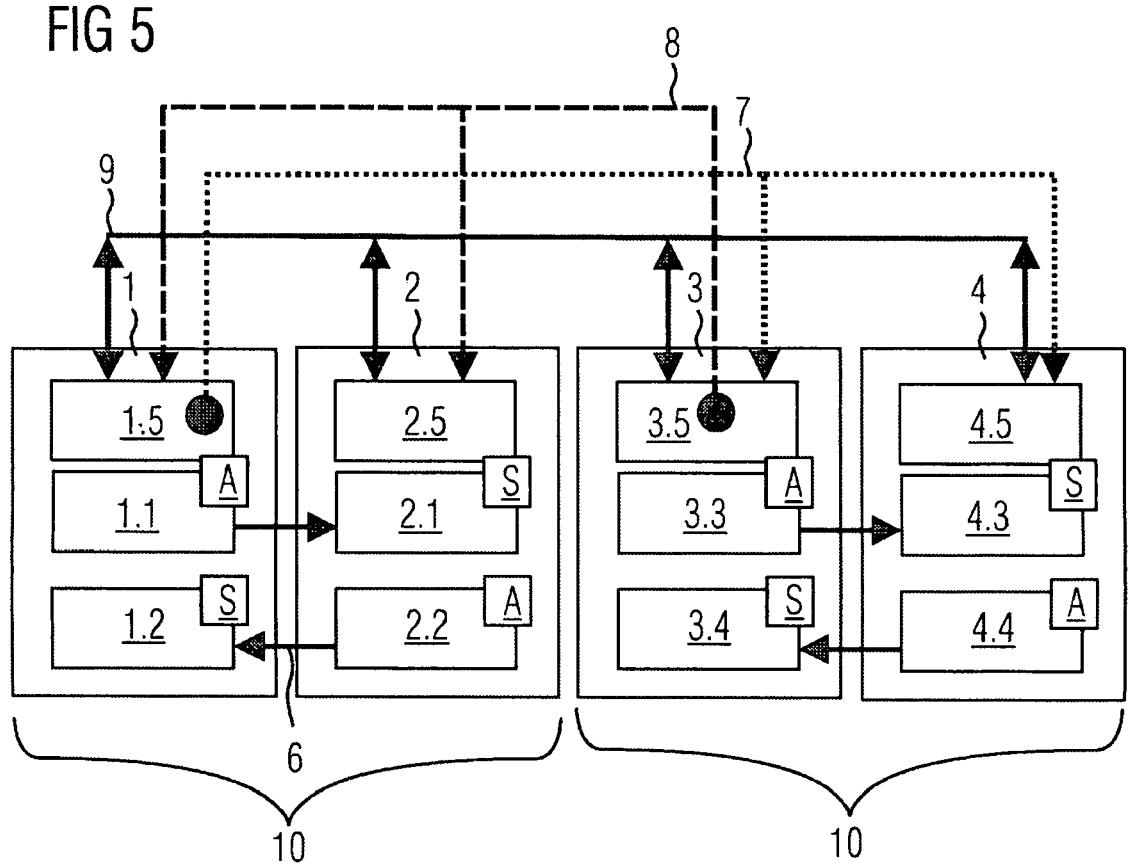

FIG. 1 Redundant pair with two resource groups each in normal mode;

FIG. 2 Redundant pair from FIG. 1 during failure of the first hardware device;

FIG. 3 Redundant triple with three resource groups in normal mode;

FIG. 4 Redundant triple with three resource groups each in normal mode;

FIG. 5 Two redundant pairs with each redundant pair being controlled by a failover control process of the other redundant pair.

DETAILED DESCRIPTION OF INVENTION

FIG. 1 shows two hardware units 1 and 2, which form a redundant pair 10, in normal mode. The safety redundancy of hardware units by means of duplicate design is already known.

In contrast to previously known redundant pairs, in redundant pair 10 from FIG. 1 both the first hardware unit 1 and the second hardware unit 2 each have available two resource groups 1.1, 1.2 and 2.1, 2.2. The individual resource groups 1.1, 1.2 and 2.1, 2.2 can furthermore be formed for specific tasks by combining corresponding components, with mainly specific data, with the software process and communication channels 5 using this data being combined in one resource group 1. 1, 1.2 and 2.1, 2.2.

For example, two software processes 1.1.4 and 1.1.5 run on the first resource group 1.1 of the first hardware unit 1 with the first software process 1.1.4 accessing data 1.1.2 and 1.1.3 and the second software process 1.1.5 accessing data 1.1.1. A software process 1.2.2, which accesses data 1.2.1, would run on the second resource group 1.2 of the first hardware unit 1. With switching systems such as Media-Gateways, the communication channels 5 usually serve for communication between the software process and external communication partners.

The software processes that can run, the communication channels and the data of the first hardware unit 1 are present "mirrored" so to speak on the second hardware unit 2 corresponding to the redundant design of the redundant pair 10.

As a further difference from known redundant pairs, in case of redundant pair 10 from FIG. 1, there is not one hardware unit completely in active mode and the other hardware unit completely in standby mode but instead there is exactly one resource group actively operated on one hardware unit. Therefore, each hardware unit is active.

An A or an S in the right-hand or left-hand top corner of the resource group 1.1, 1.2, and 2.1, 2.2 indicates which of the resource groups 1.1, 1.2 and 2.1, 2.2 is presently in active mode and which is in standby mode. In the first hardware unit 1, the first resource group 1.1 is active and the second resource group 1.2 is in standby mode. In the second hardware unit 2, the first resource group 2.1 is in standby mode and the second resource group 2.2 is active. By means of this special active/ standby mode of both hardware units 1 and 2 and of resource groups 1.1, 1.2 and 2.1, 2.2, it is ensured that during fault-free normal mode of the redundant pair 10 at least one resource group 1.1 and 2.2 on each hardware unit is in the active role and therefore no hardware unit, neither the first hardware unit 1 nor the second hardware unit 2, is completely in the standby mode. In normal mode, the correct functioning and availability of all hardware units 1 and 2 is thus guaranteed and verified.

Furthermore in normal mode of the redundant pair 10, a data replication 6 of all data, i.e. a data copy, of the active resource groups 1.1 and 2.2 takes place into the resource groups 2.1 and 1.2 which are in standby mode. Thus, data 1.1.1 to 1.1.3 of the first and active resource group 1.1 of the first hardware unit 1 is continuously replicated to the data in the first, and in standby mode, resource group 2.1 of the second hardware unit 2. Similarly, the data 2.2.1 of the second and active resource group 2.1 of the second hardware unit 2 is continuously replicated to the data in the second, and in standby mode, resource group 1.2 of the first hardware unit 1. In this way, this data is available from the standby components of the redundant hardware unit in the event of a fault and/or failure of one or more hardware units during the function takeover.

FIG. 2 shows the redundant pair 10 from FIG. 1 when the first hardware device 1 has failed. The failure 1.4 of the first hardware device 1 is illustrated by the hardware device being crossed out. In the event of failure 1.4 of the first hardware device 1, that can be due to either a physical fault or a software fault, the resource group 1.1 (in FIG. 1) previously operated in the active role and its function is switched in real time to hardware device 2, that has previously operated resource group 2.1 in standby mode. The failure or non-availability of the system due to the switchover is minimized by the replication of the essential data. After failure 1.4 of hardware unit 1, both resource groups 2.1 and 2.2 of hardware unit 2 are now in active mode. All functions are therefore available for the complete system.

FIG. 3 shows a redundant triple 11, i.e. three redundantly arranged hardware units 1, 2 and 3 with three resource groups in normal mode. Within the first hardware unit 1, the first resource group 1.1 is active and the second resource group 1.2 is in standby mode. Within the second hardware unit 2, the first resource group 2.1 is in standby mode and the third resource group 2.3 is active. Within the third hardware unit 3, the third resource group 3.3 is in standby mode and the second resource group 3.2 is active. There is therefore at least one active resource group 1.1. 2.3 and 3.2 on each of the three hardware units 1, 2 and 3. The correct functioning of the redundant triple 11 in normal mode is therefore an unambiguous indication of the correct functioning of all three hardware units 1, 2 and 3. For the system to function correctly at least a first, a second and a third resource group must operate actively. By means of the continuous data replication 6 it is in turn possible for a different hardware unit to take over the function of a hardware unit in the event of failure.

For example, in the event of failure of the third hardware unit 3, the functions of the active second resource group 3.2 are taken over by the second resource group 1.2 of the hardware unit 2 previously in standby mode. Despite failure of this third hardware unit 3, there is always at least a first 1.1, a second 1.2 (both are on the first hardware unit 1) and a third resource group 2.3 active. The functioning of the system is thus maintained.

FIG. 4 shows a redundant triple 11 with three resource group for each hardware unit 1, 2 and 3 in normal mode. The first resource group 1.1 is active on the first hardware unit 1. The second resource group 1.2 is in the second standby mode S2 and the third resource group 1.3 in the first standby mode S1. Equally, a resource group 2.2 and 3.3 is active on the respective second and third hardware device, the respective other resource groups 2.1, 2.3 and 3.1, 3.2 are in standby mode.

In the event of failure of the first hardware unit 1, resource group 2.1 of the second hardware unit 2 which is in the first standby mode would initially take over this function. In the event of a further failure of the second hardware unit 2, resource group 3.1 of the third hardware unit 3 would take over this function.

There are thus several different resource groups on a hardware device operating in the active role that have their standby partners on the same or different hardware devices.

It is also equally possible to operate more than one resource group on more than one hardware device in the standby role, in order to ensure the availability of the complete system even in the event of more extensive failures.

FIG. 5 shows two redundant pairs 10 with each redundant pair 10 being controlled by a failover control component (abbreviation: FO-CTRL) 1.5 and 3.5 of the other redundant pair.

The arrangement in FIG. 5 consists of four hardware devices of which the first hardware device 1 and second hardware device 2 in each case form the first redundant pair 10 and the third hardware device 3 and fourth hardware device 4 form the second redundant pair 10. Each hardware device 1, 2, 3 and 4 is operated in each case with two resource groups.

With this arrangement, the assignment, and as appropriate, the switchover of the active/standby roles is carried out by the respective failover control components 1.5 and 3.5 that actively run on each hardware device. All failover control components 1.5, 2.5, 3.5 and 4.5 cyclically exchange status data, indicated by double arrows, with reference character 9, connected by a line, that reflect the availability of the relevant resources and serve as a decision basis for the role switchover.

The failover control components 1.5, 2.5, 3.5 and 4.5 are in turn assigned to a resource group. Thus, failover control component 1.5 of the first hardware unit 1 is assigned to the first resource group 1.1. Failover control component 2.5 of the second hardware unit 2 is assigned to the first resource group 2.1. Failover control component 3.5 of the third hardware unit 3 is assigned to the third resource group 3.3 and failover control component 4.5 of the fourth hardware unit 4 is assigned to the third resource group 4.3.

By means of this assignment of the failover control components 1.5, 2.5, 3.5 and 4.5 to the resource groups, these therefore themselves have an active or standby role. Thus, if only failover control components 1.5 and 3.5 are active, failover control components 2.5 and 4.5 are in standby mode. Only the failover control component in the active role takes over control tasks and does so in each case for the resource groups of the other redundant pair 10. The active failover control component 1.5 thus controls hardware devices 3 and 4. The other active failover control component 3.5 controls hardware devices 1 and 2.

The particular controlling component is thus simply not impaired by faults on the hardware devices that it controls and whose availability it thus co-determines. The reasons, in addition to the absence of the cyclically distributed status data, for a role switchover can be a specific problem message, for example regarding software faults or imminent hardware failures such as a temperature increase or failure of redundant components.

Equally realizable are naturally simple pair arrangements where the failover control components within the redundant pair have to inform each other of the active/standby role assignment. This, of course, reduces the achievable availability of the system.

Also conceivable is the addition of further redundant pairs to the above arrangement, that themselves do not undertake any control tasks for other redundant pairs. Generally, the distribution of the resource groups to be controlled to the hardware devices is possible practically independent of the distribution of the failover control components controlling them, so that also the more complex distributions, as described above, do not significantly influence the complexity of the failover control components.

It is obvious that the aforementioned features of the invention can be used not only in the particular stated combinations but also in other combinations or alone without departing from the framework of the invention.

The invention claimed is:

1. A method for detecting the availability of system components of a communication system, comprising:
   providing a plurality of hardware devices that operate the system components of the communication system at least in duplicate,
   wherein in a normal mode of the communication system a first portion of the system components comprises active system components, and
   a second portion of the system components comprises redundant system components for the active system components operating in standby mode and taking over the function of previously active system components in the event of failure of at least one of the plurality of said hardware devices;
   combining, relative to function or task, the system components and at least a communication channel, a software process and data used by the relative system components into resource groups,
   wherein each resource group is adapted to run on at least two hardware devices of said plurality of said hardware devices,
   wherein in the normal mode of the communication system and to verify the availability of the system components:
   one resource group of the resource groups is active on precisely one single hardware device of said plurality of said hardware devices, and
   at least one redundant resource group is operated in standby mode on at least one other hardware device of said plurality of said hardware devices; and
   automatically replicating the data of the active resource group to the data of the at least one redundant resource group;
   wherein in the normal mode of the communication system at least one resource group is active on every hardware device of said plurality of said hardware devices.

2. The method as claimed in claim 1, wherein indication which system components or resource groups are active or being operated in standby mode is provided.

3. The method as claimed in claim 1, wherein active system components or active resource groups are switched over to standby mode or vice versa as required.

4. The method as claimed in claim 3, wherein the software processes or the system components used by these carry out the switchover from active to standby mode or vice versa.

5. The method as claimed in claim 3, wherein at least one failover control component carries out the switchover.

6. The method as claimed in claim 3, wherein only one failover control component that is being operated in the active role on a first hardware device of said plurality of said hardware devices carries out the switchover and in each case switches over a resource group on a different hardware device of said plurality of said hardware devices.

7. The method as claimed in claim 1, wherein the hardware devices are operated at least as a redundant pair, preferably as a redundant triple with at least two resource groups being operated on one hardware device.

8. The method as claimed in claim 3, wherein:
the failover control components are distributed over the hardware devices of said plurality of said hardware devices, and
the failover control components determine relevant status information for the operation of said resource groups and provide said status information to partner failover control components on other hardware devices of said plurality of said hardware devices.

9. The method as claimed claim 8, wherein said status information includes at least one of the following:
a CPU performance,
an availability of communication channels, and
a replication status.

* * * * *